(12) United States Patent
Takahashi et al.

(10) Patent No.: US 10,960,833 B2
(45) Date of Patent: Mar. 30, 2021

(54) VEHICLE CONTROL APPARATUS AND METHOD FOR REWRITING PROGRAM THEREFOR

(71) Applicant: Hitachi Automotive Systems, Ltd., Hitachinaka (JP)

(72) Inventors: Yohei Takahashi, Isesaki (JP); Takuya Kobayashi, Isesaki (JP); Motoki Tatsumi, Isesaki (JP); Toshihisa Arai, Isesaki (JP); Koji Yuasa, Isesaki (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 0 days.

(21) Appl. No.: 16/617,224

(22) PCT Filed: Mar. 20, 2018

(86) PCT No.: PCT/JP2018/011164
§ 371 (c)(1),
(2) Date: Nov. 26, 2019

(87) PCT Pub. No.: WO2018/220956
PCT Pub. Date: Dec. 6, 2018

(65) Prior Publication Data
US 2020/0406842 A1    Dec. 31, 2020

(30) Foreign Application Priority Data

May 29, 2017  (JP) .............................. JP2017-105866

(51) Int. Cl.
*B60R 16/023*   (2006.01)
*H04L 12/66*    (2006.01)
(Continued)

(52) U.S. Cl.
CPC ............ *B60R 16/0239* (2013.01); *G06F 8/65* (2013.01); *H04L 12/4625* (2013.01); *H04L 12/66* (2013.01); *H04W 4/40* (2018.02)

(58) Field of Classification Search
CPC . B60R 16/0239; H04L 12/66; H04L 12/4625; G06G 8/66; H04W 4/40
See application file for complete search history.

(56) References Cited

U.S. PATENT DOCUMENTS 7,552,077 B1 * 6/2009 Schluetter .............. G06Q 40/00
                                                  705/36 R
2013/0031212 A1   1/2013 Enosaki et al.
(Continued)

FOREIGN PATENT DOCUMENTS

DE    11 2014 005 4      8/2016
JP       2013-30988 A    2/2013
(Continued)

OTHER PUBLICATIONS

Japanese-language Office Action issued in Japanese Application No. 2017-105866 dated May 26, 2020 with English translation (six (6) pages).
(Continued)

*Primary Examiner* — Walter J Divito
*Assistant Examiner* — Anthony Luo
(74) *Attorney, Agent, or Firm* — Crowell & Moring LLP (57) ABSTRACT

A vehicle control apparatus according to the present invention includes a main electronic control unit, and a sub electronic control unit capable of mutual communication with the main electronic control unit. The main electronic control unit outputs a signal for preventing timeout to at least one of the external device and the sub electronic control unit, when mediating data communication between the external device and the sub electronic control unit.

8 Claims, 8 Drawing Sheets

(51) Int. Cl.
  *G06F 8/65* (2018.01)
  *H04L 12/46* (2006.01)
  *H04W 4/40* (2018.01)

(56) References Cited

U.S. PATENT DOCUMENTS

2016/0378457 A1    12/2016  Adachi et al.
2017/0026492 A1*    1/2017  Kawamura ........... H04L 67/322

FOREIGN PATENT DOCUMENTS

| JP | 2014-19280 A | 2/2014 |
| JP | 2016-188022 A | 11/2016 |
| JP | 2017-28523 A | 2/2017 |
| WO | WO 2015/159815 A1 | 10/2015 |
| WO | WO 2017/014133 A1 | 1/2017 |

OTHER PUBLICATIONS

International Search Report (PCT/ISA/210) issued in PCT Application No. PCT/JP2018/011164 dated Jun. 12, 2018 with English translation (three pages).
Japanese-language Written Opinion (PCT/ISA/237) issued in PCT Application No. PCT/JP2018/011164 dated Jun. 12, 2018 (four pages).
International Preliminary Report on Patentability (PCT/IPEA/409 & PCT/IPEA/416) with Annexes issued in PCT Application No. PCT/JP2018/011164 dated May 22, 2019 with partial English translation (17 pages).
German-language Office Action issued in German Application No. 11 2018 002 732.5 dated Sep. 11, 2020 with partial English translation (nine (9) pages).

* cited by examiner

VEHICLE CONTROL APPARATUS AND METHOD FOR REWRITING PROGRAM THEREFOR

TECHNICAL FIELD

The present invention relates to vehicle control apparatuses in which a main electronic control unit mediates data communication between an external device and a sub electronic control unit, and relates to methods for rewriting programs therefor.

BACKGROUND ART

Patent Document 1 discloses a program rewriting method in which a program rewriting device communicates, via a gateway electronic control unit (gateway ECU), with another electronic control unit to perform a program rewrite of said another electronic control unit.

REFERENCE DOCUMENT LIST

Patent Document

Patent Document 1: JP 2016-188022 A

SUMMARY OF THE INVENTION

Problem to be Solved by the Invention

When an external device communicates, via an electronic control unit having a gateway means, with another electronic control unit, the communication is performed via the communication network between the external device and the gateway electronic control unit, and via the communication network between the gateway electronic control unit and said another electronic control unit. This may cause timeout due to the difference in communication method between the two communication networks.

The present invention has been made in view of such conventional circumstances, and an object of the present invention is to provide a vehicle control apparatus, and a method for rewriting a program therefor, capable of preventing timeout in the communication mediated by a gateway electronic control unit.

Means for Solving the Problem

According to one aspect of the present invention, a main electronic control unit comprises an interface unit that provides communication with an external tool at a greater speed than a speed of communication with the sub electronic control unit. The external tool performs a program rewrite of the sub electronic control unit. The main electronic control unit is a gateway that mediates data communication between the external tool and the sub electronic control unit.

The external tool loads rewrite data of the sub electronic control unit into a storage medium of the main electronic control unit by repeating transmission and receipt of a rewrite request and a reply with the main electronic control unit.

The main electronic control unit performs the program rewrite of the sub electronic control unit based on the rewrite data loaded into the storage medium by repeating transmission and receipt of a rewrite request and a reply with the sub electronic control unit, and outputs a BUSY signal, serving as a signal for preventing timeout, to the external tool during the program rewrite of the sub electronic control unit.

Effects of the Invention

According to the present invention, it is possible for the main electronic control unit to prevent timeout in the communication mediated by the main electronic control unit.

MODE FOR CARRYING OUT THE INVENTION

Hereinbelow, an embodiment of a vehicle control apparatus and a method for rewriting a program therefor, according to the present invention, will be described with reference to the accompanying drawings.

Figure 1:
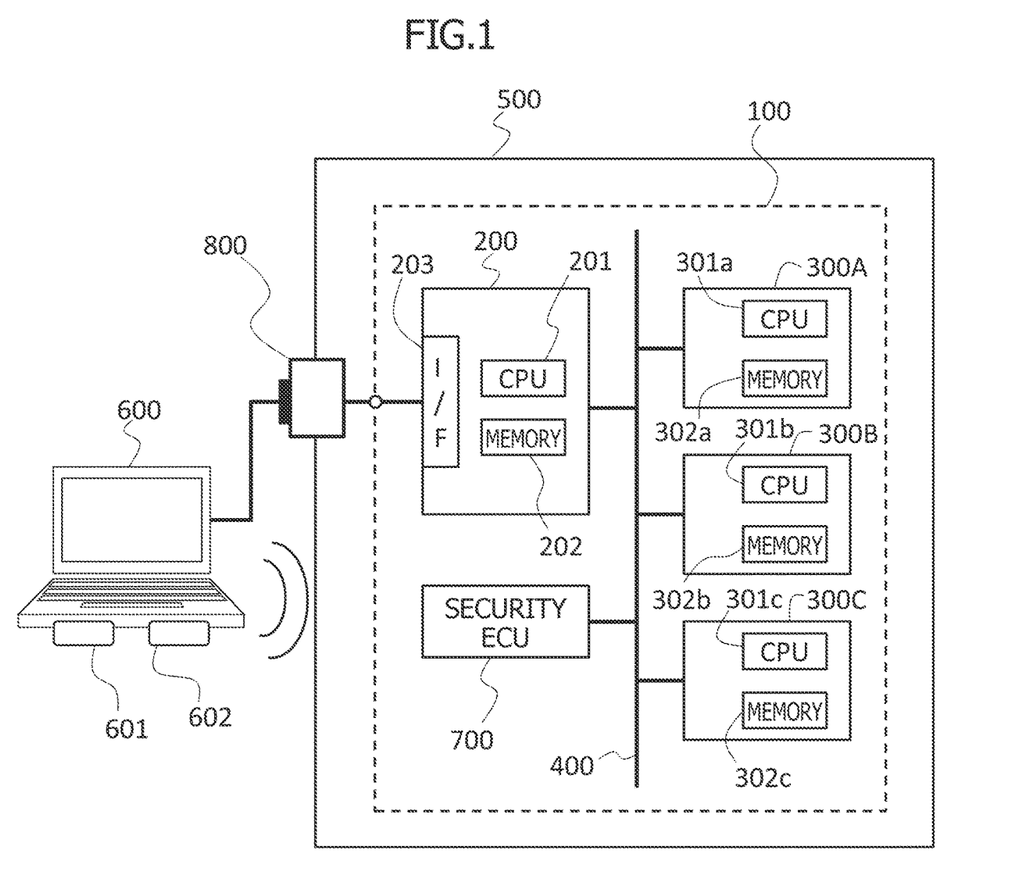
FIG. 1 is a block diagram showing an embodiment of a vehicle control apparatus according to the present invention.

FIG. 1 is a block diagram showing an aspect of a program rewriting system.

In FIG. 1, a vehicle control apparatus 100 is provided with: a main electronic control unit 200 (main ECU); multiple sub electronic control units 300A, 300B, and 300C, subjected to centralized control of main electronic control unit 200; and a network 400 to which main electronic control unit 200 and sub electronic control units 300A, 300B, and 300C (sub ECU-A, sub ECU-B, and sub ECU-C) are connected.

For example, main electronic control unit 200 is provided with a CPU 201, a storage medium 202, such as a ROM and a RAM, and an interface unit 203 for communication with an external device.

Sub electronic control units 300A, 300B, and 300C are provided with CPUs 301a, 301b, and 301c, and storage media 302a, 302b, and 302c, such as ROMs and RAMs, respectively.

Examples of sub electronic control units 300A, 300B, and 300C include: an engine control module (ECM) that controls fuel supply and ignition in an engine (internal combustion engine) mounted on a vehicle 500; a body control module (BCM) that controls various electric components of vehicle 500, such as an auto lighting system and a door lock system;

an ABS control unit (ABS-C/U) that electronically controls the braking force of the brake system of vehicle 500; and an AV control unit (AV-C/U) including an AM/FM electronic tuner, a CD/DVD drive, etc.

Herein, each sub electronic control unit 300A, 300B, 300C does not have a function or a device that directly communicates with an external device of vehicle control apparatus 100 in an in-vehicle state.

Network 400 sends and receives various types of information based on multiple communication protocols of a controller area network (CAN), a local interconnect network (LIN), etc.

In vehicle control apparatus 100 having the foregoing configuration, a rewrite operation of the program data of sub electronic control unit 300A, 300B, 300C, using a rewriting tool 600 (external tool), which is an external device, is performed by a gateway method in which main electronic control unit 200 provided with interface unit 203 for communication with the external device is used as a gateway, to provide communication between rewriting tool 600 and rewrite-target sub electronic control unit 300A, 300B, 300C.

Rewriting tool 600 includes a personal computer in which software for rewriting the program data of sub electronic control unit 300A, 300B, 300C is incorporated. Rewriting tool 600 is provided with a storage medium 601, such as a hard disk that stores program data for rewrite (application program, etc.), and a communication circuit 602 for providing communication with main electronic control unit 200.

Rewriting tool 600 achieves mutual communication (wired communication) with main electronic control unit 200 by connecting a harness to a diagnostic device connector 800 (OBD connector), or the like, provided in vehicle control apparatus 100 during the rewrite operation, so as to transfer the program data stored in storage medium 601 to rewrite-target sub electronic control unit 300A, 300B, 300C, via main electronic control unit 200.

An operator who operates rewriting tool 600 can interactively issue an instruction to rewriting tool 600 using a keyboard and a liquid crystal screen provided in the personal computer.

Figure 2:
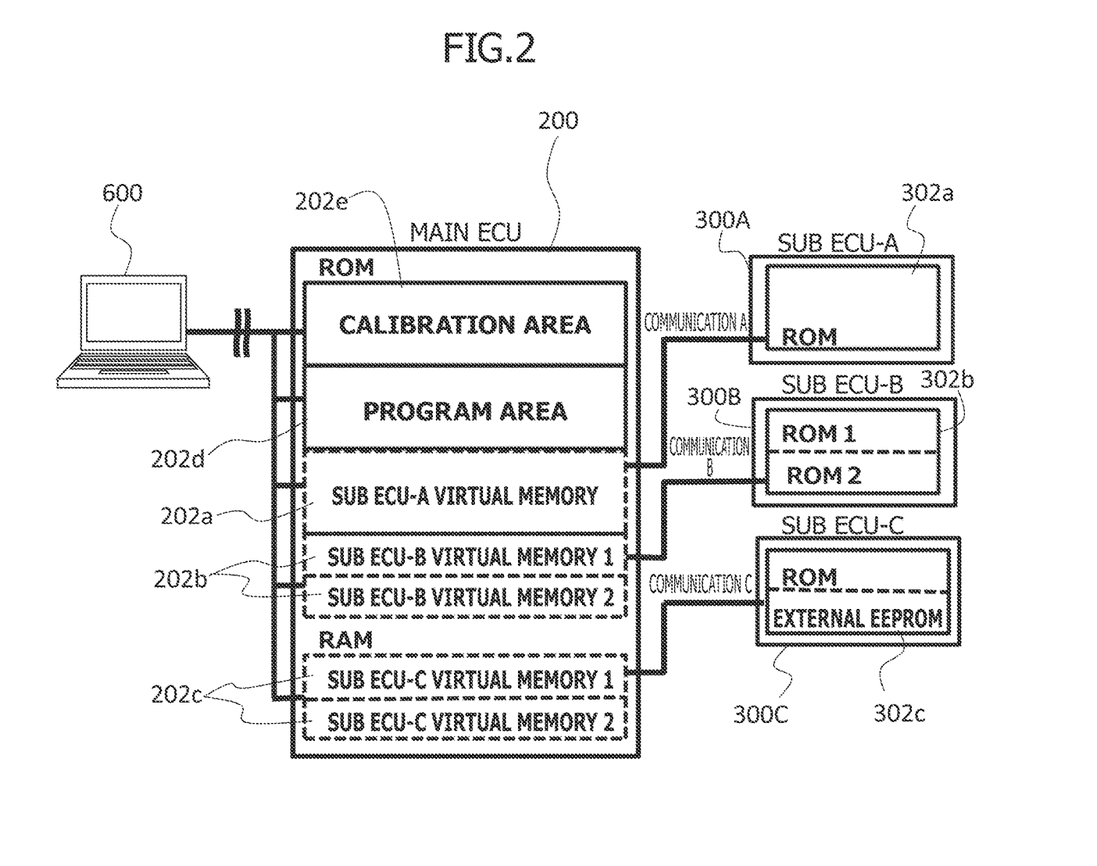
FIG. 2 is a diagram showing a virtual memory area of a main electronic control unit according to the embodiment of the present invention.

FIG. 2 is a diagram for explaining a gateway function of main electronic control unit 200.

As shown in FIG. 2, storage medium 202 of main electronic control unit 200 has virtual memory areas, each allocated to corresponding sub electronic control unit 300A, 300B, 300C.

That is, in one aspect shown in FIG. 2, the ROM, which is storage medium 202 of main electronic control unit 200, has a virtual memory area 202a for sub electronic control unit 300A, and virtual memory areas 202b and 202b for sub electronic control unit 300B, in addition to a calibration area 202e and a program area 202d. The RAM, which is storage medium 202 of main electronic control unit 200, has virtual memory areas 202c and 202c for sub electronic control unit 300C.

Herein, rewriting tool 600 is able to access virtual memory areas 202a, 202b, and 202c, similarly to calibration area 202e and program area 202d. Virtual memory areas 202a, 202b, and 202c temporarily store program data for the rewrite (rewrite data) of rewrite-target sub electronic control units 300A, 300B, and 300C, respectively.

Main electronic control unit 200 transfers the program data stored in virtual memory areas 202a, 202b, and 202c, to corresponding, rewrite-target sub electronic control units 300A, 300B, and 300C, and mediates data communication between rewriting tool 600 and sub electronic control units 300A, 300B, 300C.

In this way, main electronic control unit 200 has a function serving as a gateway means that mediates data communication between rewriting tool 600 and rewrite-target sub electronic control unit 300A, 300B, 300C.

Figure 3:
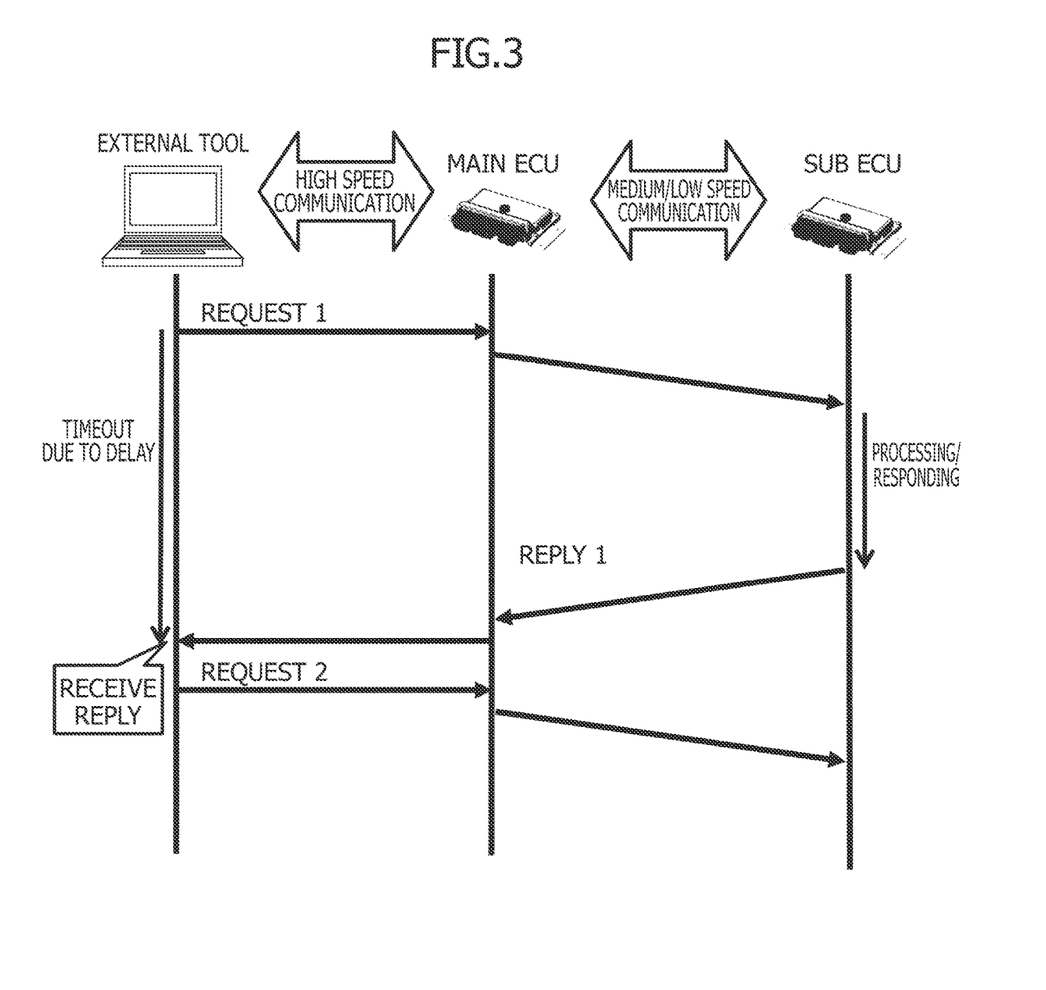
FIG. 3 is a diagram for explaining the occurrence of timeout, according to the embodiment of the present invention.

FIG. 3 is a diagram for explaining the occurrence of timeout in communication using main electronic control unit 200 as a gateway.

In a system shown in FIG. 3, the communication speed between rewriting tool 600 and main electronic control unit 200 is greater than that between main electronic control unit 200 and sub electronic control unit 300A, 300B, 300C, that is, the communication between rewriting tool 600 and main electronic control unit 200 is high speed communication, and the communication between main electronic control unit 200 and sub electronic control unit 300A, 300B, 300C is low or medium speed communication.

Herein, the timeout is to automatically stop a communication process when communication does not start or is not completed within a certain period of time.

In FIG. 3, when rewriting tool 600 outputs a first rewrite request (rewrite data) for each rewrite unit of program data to main electronic control unit 200, main electronic control unit 200 has the first rewrite request subjected to hardware processing and software processing, and then, transfers the first rewrite request to sub electronic control unit 300A, 300B, 300C, that is, a target of a program data rewrite.

Then, sub electronic control unit 300A, 300B, 300C, which has received the first rewrite request, performs a rewriting process based on the first rewrite request, and then, sends a first reply to main electronic control unit 200. Main electronic control unit 200 has the first reply subjected to hardware processing and software processing, and then transfers the first reply to rewriting tool 600.

Upon receiving the first reply, rewriting tool 600 determines that a condition for sending a second rewrite request is satisfied, outputs the second rewrite request to main electronic control unit 200, and waits for sub electronic control unit 300A, 300B, 300C to send back a second reply via main electronic control unit 200.

In this way, rewriting tool 600 sends program data for the rewrite to sub electronic control unit 300A, 300B, 300C, by outputting a rewrite request, and then when receiving a reply to the rewrite request, outputting a next rewrite request, and repeating this processing thereafter.

Herein, the communication between rewriting tool 600 and main electronic control unit 200 is performed at high speed, whereas the communication between main electronic control unit 200 and sub electronic control unit 300A, 300B, 300C is performed at low or medium speed, so that communication time takes longer. Furthermore, since main electronic control unit 200 is used as a gateway, it takes time to process the rewrite request and reply in main electronic control unit 200.

For these reasons, there is a possibility that a specified period of time elapses after output of a rewrite request but before receipt of a reply to the rewrite request in rewriting tool 600, so that timeout occurs, that is, rewriting tool 600 stops communicating (i.e., stops sending rewrite data).

Thus, main electronic control unit 200 has a function (communication maintaining means) that outputs a signal for preventing timeout when functioning as a gateway, in other words, a signal for preventing communication interruption.

Figure 4:
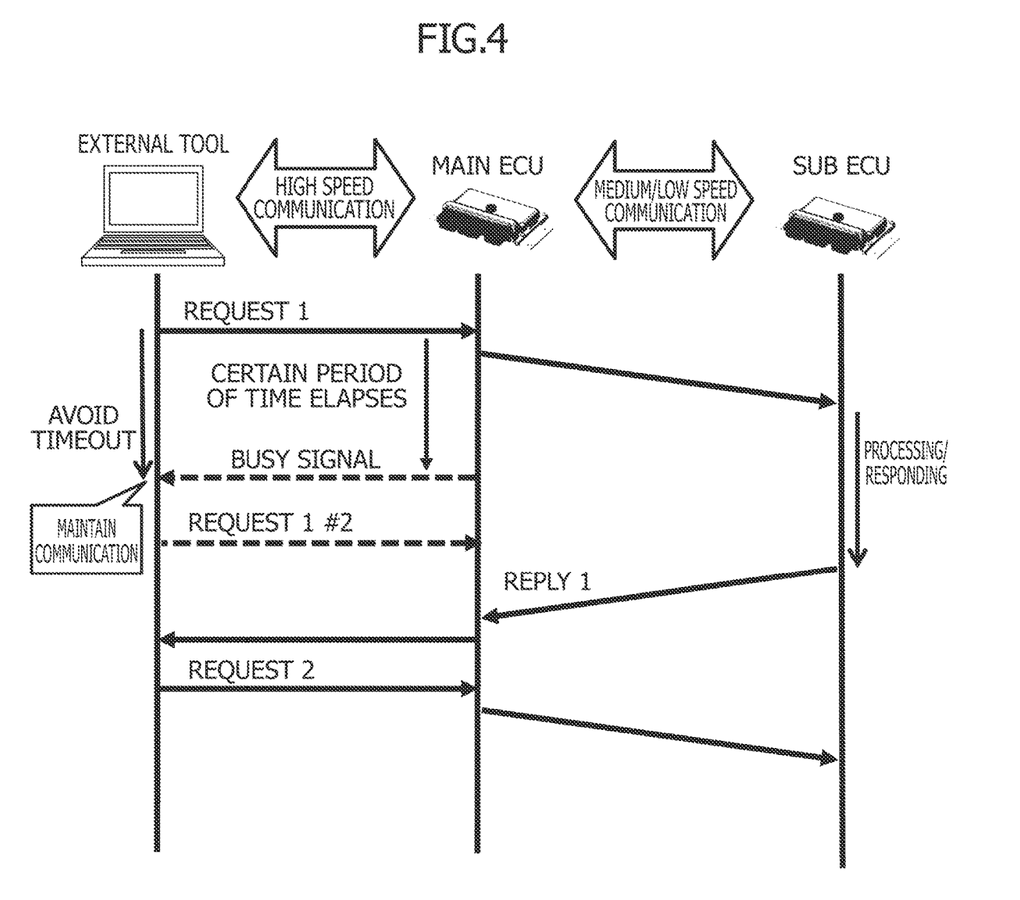
FIG. 4 is a diagram for explaining a process of preventing timeout by a BUSY signal, according to the embodiment of the present invention.

FIG. 4 shows a process in which main electronic control unit 200 outputs, to rewriting tool 600, a BUSY signal serving as a signal for preventing timeout.

In the system of FIG. 4, similarly to FIG. 3, the communication between rewriting tool 600 and main electronic control unit 200 is high speed communication, and the communication between main electronic control unit 200 and sub electronic control unit 300A, 300B, 300C is low or medium speed communication.

Main electronic control unit 200 executes a process of outputting the BUSY signal to rewriting tool 600 when a predetermined certain period of time has elapsed after rewriting tool 600 sends a rewrite request. Furthermore, main electronic control unit 200 executes a process of absorbing a new rewrite request from rewriting tool 600 during a period from the output of the BUSY signal to rewriting tool 600 until transfer of a reply to rewriting tool 600.

It should be noted that the BUSY signal is a signal indicating that the process based on the previous rewrite request has not been completed and a new request is not accepted.

Thus, outputting the BUSY signal from main electronic control unit 200 to rewriting tool 600 causes rewriting tool 600 to recognize that the process based on the request is in progress, and thus, it is possible to prevent timeout.

That is, even when the communication speed between main electronic control unit 200 and sub electronic control unit 300A, 300B, 300C is less than that between rewriting tool 600 and main electronic control unit 200, and even if it takes time for main electronic control unit 200 to perform the communication mediation process, it is possible to prevent timeout in rewriting tool 600, and it is possible to have rewriting tool 600 continue the rewriting process of the program data of sub electronic control unit 300A, 300B, 300C.

Contrary to the systems of FIGS. 3 and 4, when the communication between rewriting tool 600 and main electronic control unit 200 is low or medium speed communication, and the communication between main electronic control unit 200 and sub electronic control unit 300A, 300B, 300C is high speed communication, there is a possibility that timeout will occur in sub electronic control unit 300A, 300B, 300C.

Figure 5:
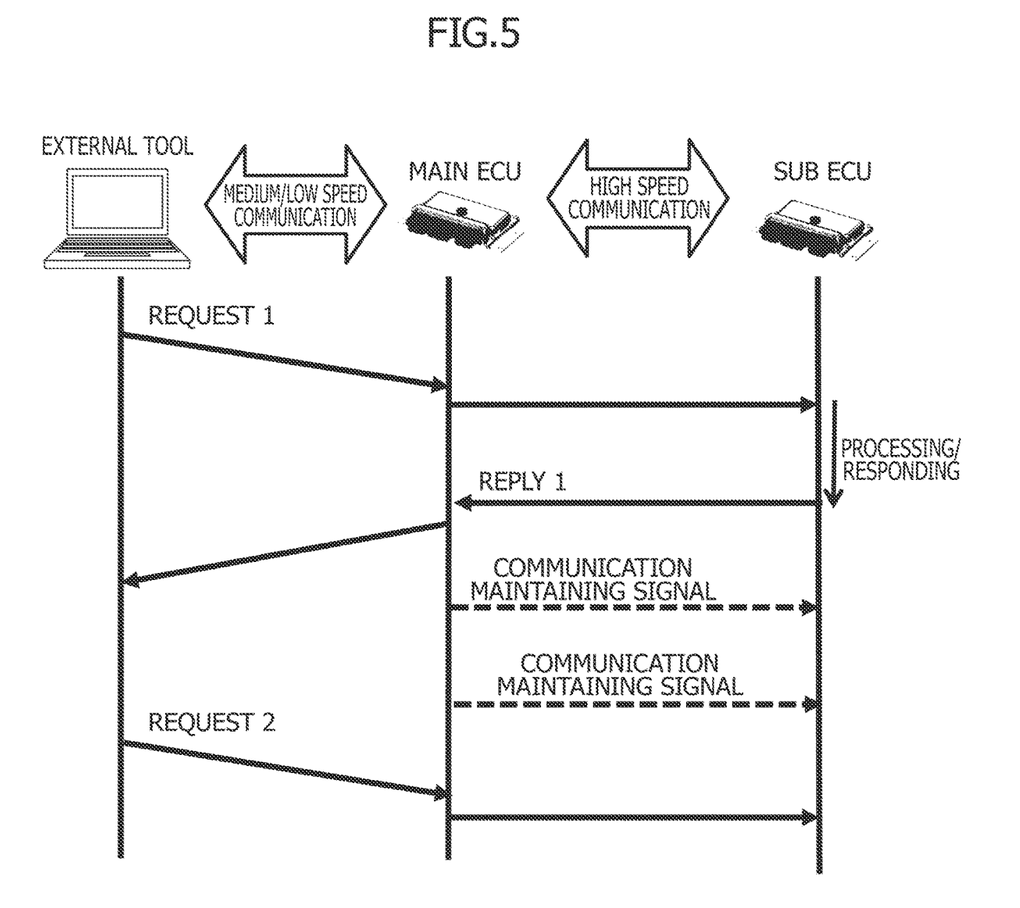
FIG. 5 is a diagram for explaining a process of preventing timeout by a communication maintaining signal, according to the embodiment of the present invention.

FIG. 5 shows a process in which main electronic control unit 200 outputs a signal for preventing timeout in sub electronic control unit 300A, 300B, 300C.

That is, when the communication between main electronic control unit 200 and sub electronic control unit 300A, 300B, 300C is high speed communication, and the communication between rewriting tool 600 and main electronic control unit 200 is low or medium speed communication, it takes a longer time to communicate between rewriting tool 600 and main electronic control unit 200. Furthermore, it takes time for main electronic control unit 200 to process a rewrite request and a reply (mediation process). This may increase a period from output of a reply from sub electronic control unit 300A, 300B, 300C until receipt of a next rewrite request. There is a possibility that sub electronic control unit 300A, 300B, 300C will stop communication due to the timeout.

Thus, main electronic control unit 200 outputs a communication maintaining signal, serving as a signal for preventing timeout, at regular intervals to rewrite-target sub electronic control unit 300A, 300B, 300C, during a period from when sub electronic control unit 300A, 300B, 300C outputs a reply until a next rewrite request is transferred to sub electronic control unit 300A, 300B, 300C.

Herein, the communication maintaining signal is a signal indicating that transmission of a new request is delayed.

Thus, sub electronic control unit 300A, 300B, 300C is able to maintain communication and prevent timeout during a period from output of a reply until receipt of a next rewrite request.

Although FIG. 4 shows a case in which the communication between main electronic control unit 200 and each of sub electronic control units 300A, 300B, and 300C is low or medium speed communication, and FIG. 5 shows a case in which the communication between main electronic control unit 200 and each of sub electronic control units 300A, 300B, and 300C is high speed communication, the speed of communication with main electronic control unit 200 may vary for each of sub electronic control units 300A, 300B, and 300C.

Figure 6:
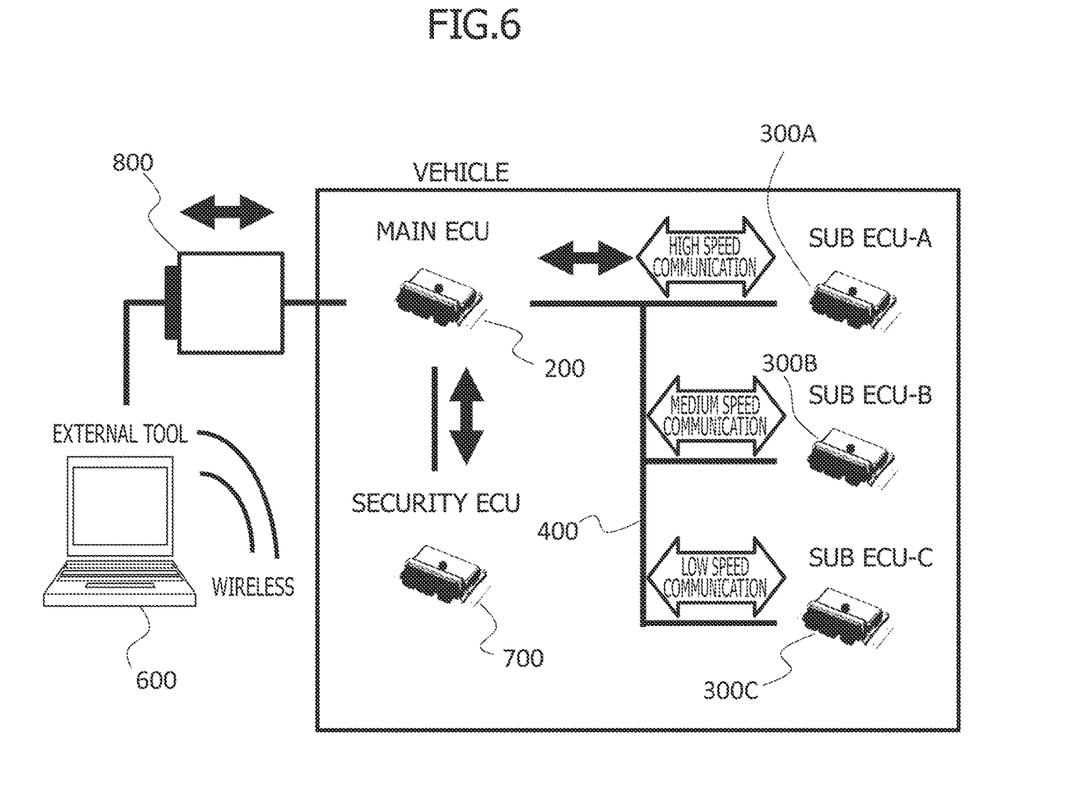
FIG. 6 is a diagram illustrating communication methods varying between sub electronic control units, according to the embodiment of the present invention.

FIG. 6 illustrates a case in which the speed of communication (communication method) with main electronic control unit 200 varies for each of sub electronic control units 300A, 300B, and 300C.

In FIG. 6, the communication between main electronic control unit 200 and sub electronic control unit 300A is high speed communication, the communication between main electronic control unit 200 and sub electronic control unit 300B is medium speed communication, and the communication between main electronic control unit 200 and sub electronic control unit 300C is low speed communication.

Here, main electronic control unit 200 identifies the communication protocol of a connected device in a higher layer (rewriting tool 600) and connected devices in a lower layer (sub electronic control units 300A, 300B, 300C), and performs a timeout preventing operation (signal outputting process to prevent timeout) depending on combination of the upper layer device and the lower layer devices.

For example, in a case in which the communication between main electronic control unit 200 and rewriting tool 600 is high speed communication, and a rewrite-target electronic control unit is sub electronic control unit 300C, which communicates at a low speed, or sub electronic control unit 300B, which communicates at a medium speed, main electronic control unit 200 outputs a BUSY signal, serving as a signal for preventing timeout, to rewriting tool 600 when a certain period of time has elapsed after main electronic control unit 200 receives a rewrite request, as shown in FIG. 4.

This makes it possible to prevent timeout in rewriting tool 600, even if it takes time to receive a reply after the output of the rewrite request.

On the other hand, in a case in which the communication between main electronic control unit 200 and rewriting tool 600 is low or medium speed communication, and an electronic control unit, that is, a target of a program data rewrite, is sub electronic control unit 300A, which communicates at high speed, main electronic control unit 200 outputs a communication maintaining signal, serving as a signal for preventing timeout, to sub electronic control unit 300A during a period from receipt of a reply from sub electronic control unit 300A until transfer of a next rewrite request to sub electronic control unit 300A, as shown in FIG. 5.

This makes it possible to prevent the timeout in sub electronic control unit 300A, even if it takes time to receive the next rewrite request after output of the reply.

It should be noted that the communication between rewriting tool 600 and main electronic control unit 200 is not limited to wired communication, and main electronic control unit 200 may achieve similar advantageous effects by performing an outputting process of a signal for preventing timeout through wireless communication.

FIGS. 1 and 6 show a case in which a security electronic control unit 700 provided in vehicle control apparatus 100 performs wireless communication with rewriting tool 600 as one aspect of wireless communication.

Security electronic control unit 700 has a function of performing wireless communication externally, and a function of preventing unauthorized data transmission to sub electronic control units 300A, 300B, and 300C, via network 400.

In the program rewrite of sub electronic control unit 300A, 300B, 300C, wireless communication is performed between rewriting tool 600, which has a wireless communication function, and security electronic control unit 700. Main electronic control unit 200 receives a signal from rewriting tool 600 via security electronic control unit 700, and outputs a signal to rewriting tool 600 via security electronic control unit 700.

Thus, even when security electronic control unit 700 and rewriting tool 600 communicate wirelessly, it is possible for main electronic control unit 200 to identify the communication protocol of a connected device in a higher layer (rewriting tool 600) and connected devices in a lower layer (sub electronic control units 300A, 300B, 300C), and to perform a timeout preventing operation (signal outputting process to prevent timeout) depending on combination of the upper layer device and the lower layer devices.

Figure 7:
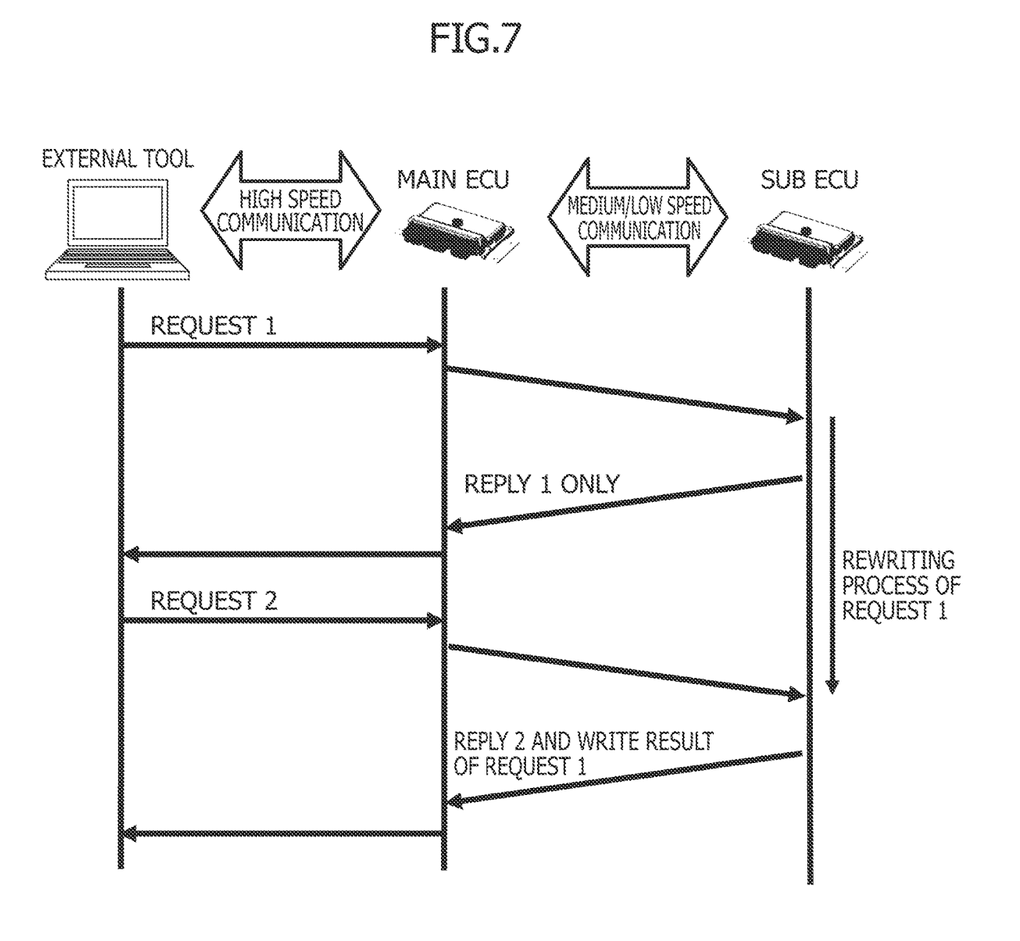
FIG. 7 is a diagram showing a process of ensuring a time for a rewriting process performed in a sub electronic control unit, according to the embodiment of the present invention.

FIG. 7 is a diagram for explaining a process of ensuring a rewriting time in sub electronic control unit 300A, 300B, 300C.

In the system of FIG. 7, the communication between rewriting tool 600 and main electronic control unit 200 is high speed communication, and the communication between main electronic control unit 200 and rewrite-target sub electronic control unit 300A, 300B, 300C, is medium speed communication.

In such a system, sub electronic control unit 300A, 300B, 300C performs a process of outputting a reply to rewriting tool 600 when receiving a rewrite request from rewriting tool 600 via main electronic control unit 200.

Then, sub electronic control unit 300A, 300B, 300C performs the rewriting process before receiving a next rewrite request, and then, when outputting a reply to the next rewrite request to rewriting tool 600, sub electronic control unit 300A, 300B, 300C sends a signal indicating the result of the rewriting process performed based on the rewrite request, to rewriting tool 600 together with the reply.

In this case, since sub electronic control unit 300A, 300B, 300C outputs, to rewriting tool 600, a reply to the rewrite request without waiting for the completion of the rewriting process performed based on the rewrite request, it is possible to prevent a specified period of time from elapsing after the output of the rewrite request before receipt of a reply in rewriting tool 600, and thus, it is possible to prevent timeout.

Furthermore, since sub electronic control unit 300A, 300B, 300C performs the rewriting process based on the rewrite request in a period from receipt of a rewrite request until receipt of a next rewrite request, it is possible to ensure, as a time for performing the rewriting process, a period of time substantially equal to the cycle of inputs of rewrite requests, which is longer than the period from receipt of a rewrite request until output of a reply to the rewrite request.

Thus, in the foregoing configuration, it is possible to continuously perform the rewriting process by rewriting tool 600, without outputting a signal for preventing timeout in main electronic control unit 200.

Figure 8:
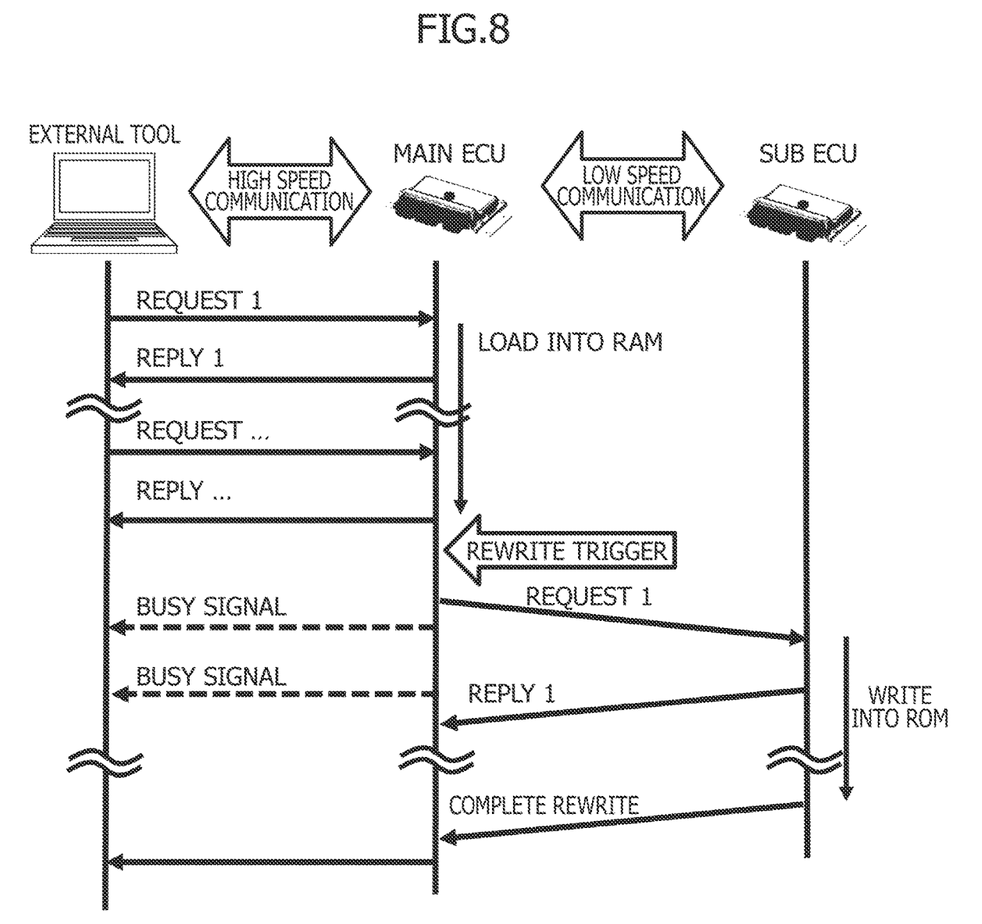
FIG. 8 is a diagram showing a process in which data for rewrite is temporarily loaded into the main electronic control unit, and then, the rewrite is performed in the sub electronic control unit, according to the embodiment of the present invention.

FIG. 8 shows a countermeasure process for coping with a case in which timeout occurs in rewriting tool 600 even performing the sending process of the reply and the rewrite result shown in FIG. 7.

In the system configuration of FIG. 8, the communication between rewriting tool 600 and main electronic control unit 200 is high speed communication, and the communication between main electronic control unit 200 and rewrite-target sub electronic control unit 300A, 300B, 300C, is low speed communication.

Then, as the rewriting process, rewriting tool 600 first loads the rewrite data of sub electronic control unit 300A, 300B, 300C into storage medium 202 (RAM) of main electronic control unit 200.

That is, a process in which rewriting tool 600 outputs a rewrite request to main electronic control unit 200, and then main electronic control unit 200 loads the rewrite request into its own storage medium 202 (RAM) and sends back a reply (loading result) to rewriting tool 600, is repeated. Thereby, the rewrite data of sub electronic control unit 300A, 300B, 300C is loaded into storage medium 202 (RAM) of main electronic control unit 200.

After the entire rewrite data is loaded into the storage medium 202 (RAM) of main electronic control unit 200, main electronic control unit 200 starts communicating with sub electronic control unit 300A, 300B, 300C in response to a rewrite trigger, to perform a rewrite of the program data of sub electronic control unit 300A, 300B, 300C.

For example, the rewrite trigger may be configured to be given from rewriting tool 600 to main electronic control unit 200. Alternatively, when main electronic control unit 200 has a power maintaining function (self-shutoff function), a signal of the power switch of main electronic control unit 200 (switching from ON to OFF) may be used as a rewrite trigger signal.

Main electronic control unit 200, which has received the rewrite trigger, outputs a rewrite request to rewrite-target sub electronic control unit 300A, 300B, 300C, and then when receiving a reply from sub electronic control unit 300A, 300B, 300C, outputs a next rewrite request. This operation is repeated to perform the rewrite of the program data of rewrite-target sub electronic control unit 300A, 300B, 300C.

Furthermore, in order to prevent occurrence of timeout in rewriting tool 600, main electronic control unit 200 outputs a BUSY signal to rewriting tool 600 at regular intervals while communicating with rewrite-target sub electronic control unit 300A, 300B, 300C, to have the rewriting process performed.

On the other hand, rewriting tool 600 is in a standby state waiting for completion of the rewrite (i.e., in a state in which the communication is interrupted) while main electronic control unit 200 and sub electronic control unit 300A, 300B, 300C communicate to perform the rewrite. Then, when rewriting tool 600 receives a rewrite completion signal output from rewrite-target sub electronic control unit 300A, 300B, 300C, via main electronic control unit 200, the rewriting process is terminated.

Rewriting tool 600 may be turned off without waiting for the completion of the program data rewrite of sub electronic control unit 300A, 300B, 300C. In other words, the communication between rewriting tool 600 and main electronic control unit 200 may be stopped, and rewriting tool 600 may receive the result of the rewriting process from main electronic control unit 200, when rewriting tool 600 is activated next time.

Furthermore, if the program data rewrite of sub electronic control unit 300A, 300B, 300C fails, main electronic control unit 200 may output a rewrite request again.

The technical concepts described in the above embodiment may be used in combination as necessary, as long as no conflict arises.

Although the present invention is described in detail with reference to the preferred embodiment, it is apparent that one skilled in the art may make various modifications based on the fundamental technical concepts and teachings of the present invention.

For example, when main electronic control unit 200 has a function of wirelessly communicating externally, main electronic control unit 200 may wirelessly communicate directly with rewriting tool 600, to mediate the data communication between rewriting tool 600 and sub electronic control units 300A, 300B, and 300C.

Furthermore, security electronic control unit 700 that wirelessly communicates with rewriting tool 600 may communicate directly with sub electronic control units 300A, 300B, and 300C via network 400, to mediate the data communication between rewriting tool 600 and sub electronic control units 300A, 300B, and 300C.

Hereinbelow, the technical concept understood from the foregoing embodiment will be described.

According to an aspect, a vehicle control apparatus comprises:
   a main electronic control unit; and
   a sub electronic control unit capable of mutual communication with the main electronic control unit,
   wherein the main electronic control unit comprises:
   a gateway means that mediates data communication between an external device and the sub electronic control unit;
   a communication method identifying means that identifies a communication method used in communication with the external device, and a communication method used in communication with the sub electronic control unit; and
   a communication maintaining means that selects one of the external device and the sub electronic control unit based on the identified communication method identified by the communication method identifying means, and outputs, to the selected one, a signal for preventing timeout in data communication between the external device and the sub electronic control unit.

Furthermore, according to an aspect, the vehicle control apparatus comprises:
   a main electronic control unit; and
   a sub electronic control unit capable of mutual communication with the main electronic control unit,
   wherein the main electronic control unit comprises:
   a gateway means that mediates data communication between an external device and the sub electronic control unit; and
   a communication maintaining means that outputs a BUSY signal to the external device at regular intervals during a period from receipt of a request signal output from the external device until receipt of a reply signal output from the sub electronic control unit in response to the request signal, when a communication speed between the external device and the main electronic control unit is greater than a communication speed between the main electronic control unit and the sub electronic control unit.

Furthermore, according to an aspect, the vehicle control apparatus comprises:
   a main electronic control unit; and
   a sub electronic control unit capable of mutual communication with the main electronic control unit,
   wherein the main electronic control unit comprises:
   a gateway means that mediates data communication between an external device and the sub electronic control unit; and
   a communication maintaining means that outputs a communication maintaining signal to the sub electronic control unit at regular intervals during a period from receipt of a reply signal output from the sub electronic control unit until receipt of a request signal output from the external device, when a communication speed between the external device and the main electronic control unit is less than a communication speed between the main electronic control unit and the sub electronic control unit.

REFERENCE SYMBOL LIST

100 Vehicle control apparatus
200 Main electronic control unit
300A to 300C Sub electronic control units
400 Network
600 Rewriting tool (external device)

The invention claimed is:
1. A vehicle control apparatus comprising:
   a main electronic control unit; and
   a sub electronic control unit capable of mutual communication with the main electronic control unit,
   wherein the main electronic control unit comprises an interface unit that provides communication with an external tool at a greater speed than a speed of communication with the sub electronic control unit, the external tool performing a program rewrite of the sub electronic control unit, wherein the main electronic control unit is a gateway that mediates data communication between the external tool and the sub electronic control unit,
   wherein the external tool loads rewrite data of the sub electronic control unit into a storage medium of the main electronic control unit by repeating transmission and receipt of a rewrite request and a reply with the main electronic control unit,
   wherein the main electronic control unit performs the program rewrite of the sub electronic control unit based on the rewrite data loaded into the storage medium by repeating transmission and receipt of a rewrite request and a reply with the sub electronic control unit, and outputs a BUSY signal, serving as a signal for preventing timeout, to the external tool during the program rewrite of the sub electronic control unit.
2. The vehicle control apparatus according to claim 1, wherein the main electronic control unit outputs the BUSY signal to the external tool at regular intervals during the program rewrite of the sub electronic control unit.
3. The vehicle control apparatus according to claim 1, wherein the main electronic control unit starts communicating with the sub electronic control unit based on a trigger signal from the external tool.
4. The vehicle control apparatus according to claim 1, wherein the main electronic control unit has a self-shutoff function, and starts communicating with the sub electronic control unit, triggered by switching from ON to OFF of a signal of a power switch of the main electronic control unit.

5. A method for rewriting a program of a vehicle control apparatus including:
- a main electronic control unit; and
- a sub electronic control unit capable of mutual communication with the main electronic control unit,
- the method performing a program rewrite of the sub electronic control unit by an external device through data communication between an external tool and the sub electronic control unit mediated by the main electronic control unit,
- the method comprising, when a communication speed between the external tool and the main electronic control unit is greater than a communication speed between the main electronic control unit and the sub electronic control unit,
- loading, by the external tool, rewrite data of the sub electronic control unit into a storage medium of the main electronic control unit by repeating transmission and receipt of a rewrite request and a reply with the main electronic control unit, and
- performing, by the main electronic control unit, the program rewrite of the sub electronic control unit based on the rewrite data loaded into the storage medium by repeating transmission and receipt of a rewrite request and a reply with the sub electronic control unit, and outputting, by the main electronic control unit, a BUSY signal, serving as a signal for preventing timeout, to the external tool during the program rewrite of the sub electronic control unit.

6. The method for rewriting a program of the vehicle control apparatus, according to claim 5, wherein the main electronic control unit outputs the BUSY signal to the external tool at regular intervals during the program rewrite of the sub electronic control unit.

7. The method for rewriting a program of the vehicle control apparatus, according to claim 5, wherein the main electronic control unit starts communicating with the sub electronic control unit based on a trigger signal from the external tool.

8. The method for rewriting a program of the vehicle control apparatus, according to claim 5, wherein the main electronic control unit has a self-shutoff function, and starts communicating with the sub electronic control unit, triggered by switching from ON to OFF of a signal of a power switch of the main electronic control unit.

* * * * *